IS 009124925B2

(12) United States Patent  (10) Patent No.: US 9,124,925 B2
Sprague et al.  (45) Date of Patent: Sep. 1, 2015

(54) SYSTEM AND METHOD FOR CONDITIONAL ACCESS IN AN IN-HOME NETWORK BASED ON MULTI-NETWORK COMMUNICATION

(75) Inventors: Brian Sprague, Irvine, CA (US); Glenn Chang, Carlsbad, CA (US); Timothy Gallagher, Encinitas, CA (US); Sridhar Ramesh, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 200 days.

(21) Appl. No.: 13/316,796

(22) Filed: Dec. 12, 2011

(65) Prior Publication Data

US 2012/0297414 A1  Nov. 22, 2012

Related U.S. Application Data

(60) Provisional application No. 61/487,979, filed on May 19, 2011.

(51) Int. Cl.
*H04N 7/167* (2011.01)
*H04N 21/436* (2011.01)
(Continued)

(52) U.S. Cl.
CPC ..... *H04N 21/43615* (2013.01); *H04N 21/4367* (2013.01); *H04N 21/4405* (2013.01); *H04N 21/4408* (2013.01); *H04N 21/4627* (2013.01); *H04N 21/60* (2013.01); *H04N 21/61* (2013.01); *H04N 21/6106* (2013.01); *H04N 21/6143* (2013.01); *H04N 21/6193* (2013.01);
(Continued)

(58) Field of Classification Search
CPC ..... H04N 7/108; H04N 7/163; H04N 7/1675; H04N 21/43615

USPC ............... 725/31, 78–85, 131–134, 139–142; 709/217–232
See application file for complete search history.

(56) References Cited

U.S. PATENT DOCUMENTS 5,182,771 A * 1/1993 Munich et al. ................. 380/204
5,872,519 A * 2/1999 Issa et al. ..................... 340/12.5
(Continued)

FOREIGN PATENT DOCUMENTS

EP  1494353 A3  1/2006
FR  2854015 A1  10/2004
(Continued)

OTHER PUBLICATIONS

European Search Report for EP 12003194 dated Aug. 24, 2012.

*Primary Examiner* — Annan Shang
(74) *Attorney, Agent, or Firm* — McAndrews, Held & Malloy, Ltd.

(57) ABSTRACT

One or more circuits for use in a transceiver that is collocated with a satellite dish, may receive a satellite signal carrying media content, and remove content protection from the received media content. After removing the first content protection, the one or more circuits may apply second content protection to the media content. The content protection applied by the one or more circuits may adhere to a different protocol, utilize different keys, and/or otherwise be distinguishable from the content protection that was removed. After applying the content protection, the one or more circuits may transmit the media content onto one or more links between the satellite dish and one or more client devices. The removal of the content protection may comprise descrambling and/or decrypting the media content. The application of the content protection may comprise scrambling and/or encrypting the media content.

21 Claims, 9 Drawing Sheets

(51) Int. Cl.

| | | |
|---|---|---|
| *H04N 21/61* | (2011.01) | |
| *H04N 21/63* | (2011.01) | |
| *H04N 21/637* | (2011.01) | |
| *H04N 21/64* | (2011.01) | |
| *H04N 21/643* | (2011.01) | |
| *H04N 21/6402* | (2011.01) | |
| *H04N 21/60* | (2011.01) | |
| *H04N 21/4367* | (2011.01) | |
| *H04N 21/4405* | (2011.01) | |
| *H04N 21/4408* | (2011.01) | |
| *H04N 21/4627* | (2011.01) | |

(52) U.S. Cl.
CPC ............. *H04N21/63* (2013.01); *H04N 21/637* (2013.01); *H04N 21/64* (2013.01); *H04N 21/6402* (2013.01); *H04N 21/64322* (2013.01)

(56) References Cited

U.S. PATENT DOCUMENTS

| | | | |
|---|---|---|---|
| 6,216,250 B1 * | 4/2001 | Williams | 714/799 |
| 6,424,947 B1 * | 7/2002 | Tsuria et al. | 705/1.1 |
| 6,427,013 B1 * | 7/2002 | Shimizu | 380/239 |
| 6,452,923 B1 * | 9/2002 | Gerszberg et al. | 370/352 |
| 6,622,307 B1 * | 9/2003 | Ho | 725/120 |
| 6,714,650 B1 * | 3/2004 | Maillard et al. | 380/231 |
| 7,023,992 B1 * | 4/2006 | Kubota et al. | 380/210 |
| 7,673,140 B2 * | 3/2010 | Evoy | 713/168 |
| RE42,044 E * | 1/2011 | Maillard et al. | 380/231 |
| 8,775,319 B2 * | 7/2014 | Kahn et al. | 705/59 |
| 2002/0010752 A1 * | 1/2002 | Horiguchi et al. | 709/213 |
| 2002/0046311 A1 * | 4/2002 | Kageyama | 710/105 |
| 2002/0154055 A1 | 10/2002 | Davis et al. | |
| 2005/0144468 A1 * | 6/2005 | Northcutt et al. | 713/189 |
| 2006/0262222 A1 | 11/2006 | Monnier et al. | |
| 2008/0060024 A1 | 3/2008 | Decanne | |
| 2009/0007189 A1 | 1/2009 | Gutknecht et al. | |
| 2009/0113492 A1 | 4/2009 | Norin et al. | |

FOREIGN PATENT DOCUMENTS

| | | |
|---|---|---|
| WO | 2009143082 A1 | 11/2009 |
| WO | 2011033342 A1 | 3/2011 |

* cited by examiner

SYSTEM AND METHOD FOR CONDITIONAL ACCESS IN AN IN-HOME NETWORK BASED ON MULTI-NETWORK COMMUNICATION

INCORPORATION BY REFERENCE

This patent application also makes reference to:
U.S. Patent Application Provisional Ser. No. 61/487,979 entitled "Efficient Architecture for Broadband Receivers" filed on May 19, 2011;

Each of the above stated applications is hereby incorporated herein by reference in its entirety.

FIELD OF THE INVENTION

Certain embodiments of the invention relate to satellite television. More specifically, certain embodiments of the invention relate to a system for method for conditional access in an in-home network based on multi-network communication.

BACKGROUND OF THE INVENTION

Existing systems for conditional access are overly expensive and often ineffective. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for conditional access in an in-home network based on multi-network communication, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuit" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the terms "e.g." or "for example" introduce a list of one or more non-limiting examples, instances, or illustrations.

Figure 1:
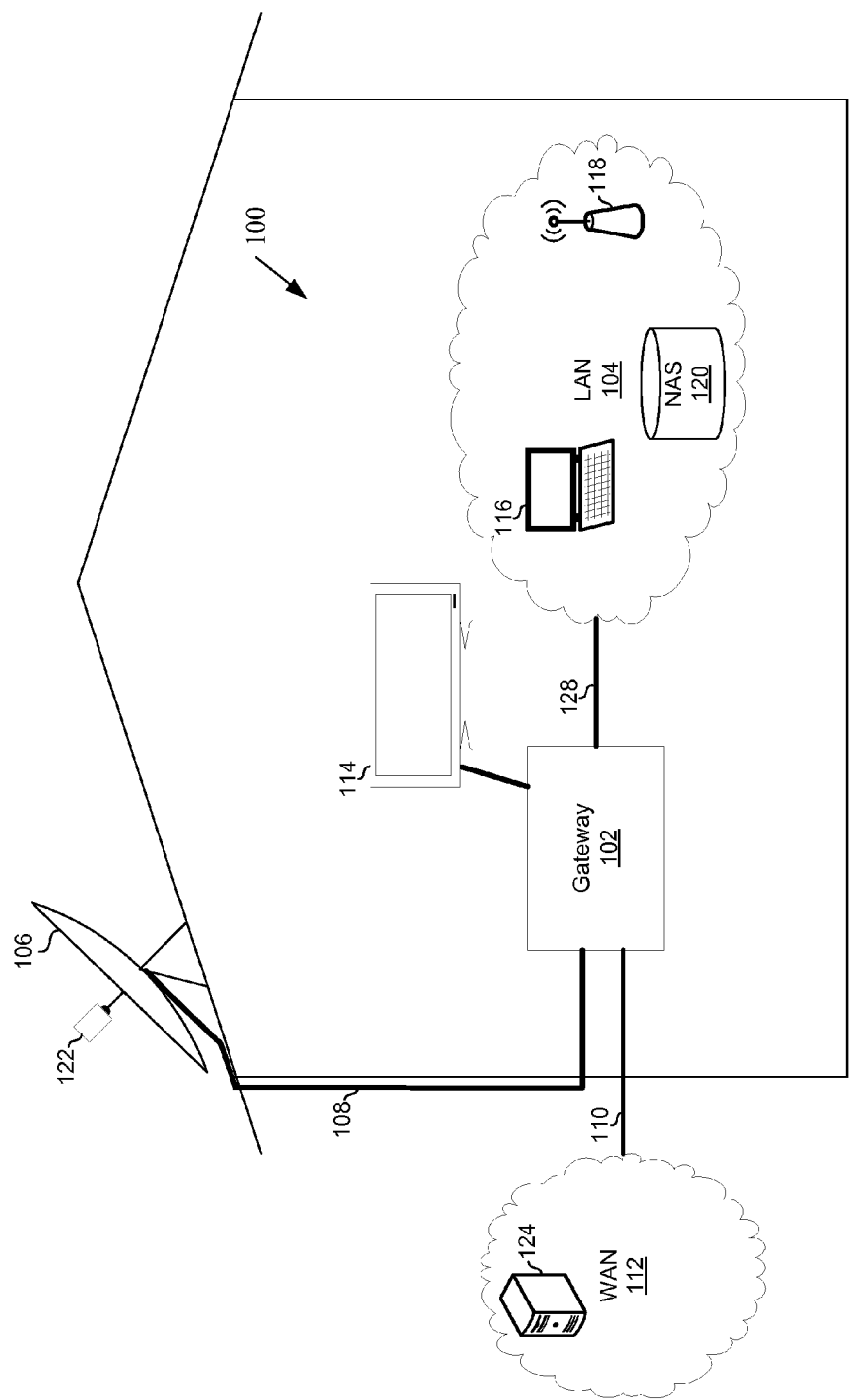
FIG. 1 depicts an exemplary satellite television system.

FIG. 1 depicts an exemplary satellite television system. As shown in FIG. 1, the system 100 comprises an exemplary in-home network 100, a satellite dish 106 comprising a module 122, a wide area network (WAN) 112 comprising one or more servers 124, a network link 108 connecting the dish 106 and the in-home network 100, and a link 110 connecting the in-home network 100 and the WAN 112. The exemplary in-home network 100 comprises a gateway 102, television 114, and a local area network (LAN) 104.

The satellite dish 106 may comprise circuitry operable to receive satellite signals and output the received signals to the gateway 102 via the communication link 108. The satellite dish 106 may, for example, comprise the Internet Protocol (IP) low noise block-downconverter (LNB) 122 described below with respect to FIG. 2.

Each of the communication links 108 and 110 may comprise one or more wired, wireless, and/or optical links. The communication link 108 may comprise, for example, a coaxial cable and/or a 60 GHz wireless link which carries physical layer symbols in accordance with, for example, Multimedia over Coax Alliance (MoCA) or Ethernet standards. The communication link 110 may comprise, for example, a coaxial cable or Cat-5e cable which carries physical layer symbols in accordance with, for example, DSL or Ethernet standards.

The gateway 102 may comprise circuitry operable to receive satellite signals, process the received signals to recover data, and output the data to an end-user device such as the television 114. The gateway 102 may also comprise circuitry operable to transmit and/or receive data over the communication link 110. Communications over the link 128 may be in accordance with, for example, Multimedia over Coax Alliance (MoCA) and/or Ethernet standards. Details of an exemplary gateway 102 are described below with respect to FIG. 3. The gateway 102 may, for example, be a stand-alone unit or may be integrated with a television set top box (STB) or other device of the network 100.

The television 114 may comprise circuitry operable to receive media and control data via one or more point-to-point media links (e.g., HDMI), process the received data to recover audio and/or video, and present the audio and/or video to a viewer.

The WAN 112 may comprise, for example, a DSL (or cable) headend and associated circuitry and/or devices. Such devices may include one or more servers 124 which are operable to communicate with the gateway 102 to communicate general IP traffic and/or to communicate control information pertaining to satellite television communications. For example, the server 124 may establish a secure connection to the gateway 102 to exchange security keys for decrypting and/or descrambling signals received via the dish 106.

The LAN 104 may comprise any number and/or type of networking devices. Exemplary devices shown include a computer 116, network attached storage 120, and a wireless access point (WAP) 118. The devices of the LAN 104 may communicate utilizing, for example, MoCA and/or Ethernet protocols.

Figure 2:
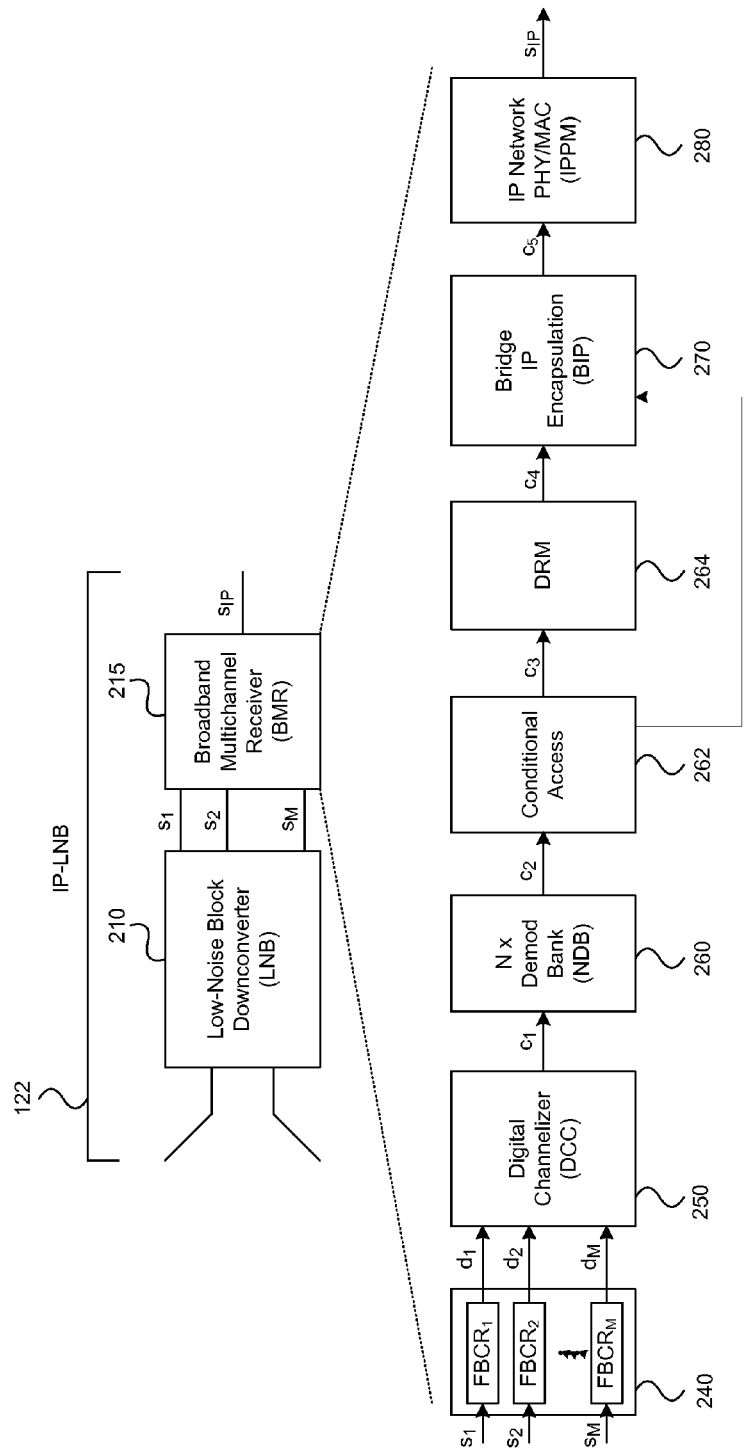
FIG. 2 depicts an exemplary Internet Protocol low-noise block-downconverter (IP-LNB).

FIG. 2 depicts an exemplary circuitry collocated with a satellite dish. The transceiver circuit 122, referred to herein as IP-LNB 122, comprises a low-noise block-downconverter 210 and a broadband multichannel receiver (BMR) 215. The LNB and BMR may, for example, be integrated on a common substrate (e.g., a single silicon die).

The LNB 210 generally receives RF satellite signals, and filters and amplifies such signals to generate corresponding IF signals, which are then provided to downstream entities. The LNB 210 is illustrated outputting M (an integer number) of IF signals, labeled $s_1$ to $s_M$. Each of such IF signals may, for example, comprise IF signals in the 950 MHz to 2150 MHz range, each of which corresponding to a respective satellite signal (e.g., a satellite television signal).

The BMR 215 may, for example, be operable to process the plurality of IF signals $s_1$-$s_M$ received from the LNB 210 and output a digital signal (e.g., one or more digital Internet Protocol (IP) signals) that communicates desired channels. For example, a non-limiting exemplary implementation of the BMR 215 is illustrated in FIG. 2, and comprises a variety of modules, for example a Full-Band Capture Receiver bank 240, Digital Channelizer 250, N×Demodulator bank 260, IP Bridge 270, Communication Interface Module 280 (e.g., an IP communication interface module comprising a MAC and PHY layer for IP networking), and a conditional access module 262.

For example, the BMR 215 may comprise a Full-Band Capture Receiver bank 240 (e.g., comprising M full-band capture receivers, $FBCR_1$-$FBCR_M$). Each of such full-band capture receivers may, for example, digitize the entire IF signal contained on a respective input IF signal from the LNB 210. In an exemplary satellite implementation, each of such full-band capture receivers may, for example, digitize the entire 950 MHz to 2150 MHz range of satellite-related content (e.g., media content) on the respective input signal. For example, $FBCR_1$ may receive analog IF signal $s_1$ from the LNB 210 and digitize the entire IF content of the input signal $s_1$ to generate output signal $d_1$. In such a manner, the full-band capture receiver bank 240 may receive M analog IF signals $s_1$-$s_M$ from the LNB 210 and output corresponding digital signals $d_1$-$d_M$.

Note that although the full-band capture receiver bank 240 is shown and discussed as receiving the M analog IF signals $s_1$-$s_M$ from the LNB 210, such signals may be received from a plurality of different sources (e.g., from one or more satellite television sources, from one or more cable television sources, from one or more terrestrial broadcast television sources, etc.). Such full-band capture receiver(s) may, for example, operate to capture the complete, or substantially complete, spectral band for a particular communication protocol, standard or not (e.g., for a satellite television communication protocol). Also, such full-band capture receiver(s) may, for example, operate to capture the complete, or substantially complete, respective spectral bands for a plurality of respective communication protocols or standards (e.g., for a satellite television communication protocol and/or a cable television communication protocol and/or a terrestrial television communication protocol, etc.).

Note that, depending on the IF bandwidth utilization and/or depending on desired channels, one or more of the plurality of FBCRs of the FBCR bank 240 may be powered down. For example, if a particular FBCR corresponds to a satellite signal that is not presently providing a desired channel, such particular FBCR may be powered down (e.g., until a need for a channel corresponding to the particular FBCR arises). Alternatively, a non-utilized FBCR may also be re-tasked to process another signal (e.g., a signal corresponding to another orbital slot, a signal corresponding to a different signal source, for example, a different satellite and/or terrestrial broadcast source, etc.).

The BMR 215 may also comprise a digital channelizer (DCC) 250. The DCC 250 may, for example, operate to receive the digitized signals $d_1$-$d_M$ output from the FBCR bank 240. The DCC 250 may then, for example, process such received digitized signals $d_1$-$d_M$ (e.g., decimating and filtering such signals) to select desired channels from the set of channels available in the digitized signals $d_1$-$d_M$. As such, the DCC 250 may, for example, serve as a crossbar for selecting an arbitrary set of desired channels from among the channels available from one or more broadband sources.

The DCC 250 may perform such processing in any of a variety of manners. For example and without limitation, the DCC 250 may utilize a polyphase filter or a block that calculates a running FFT of the received digitized signals $d_1$-$d_M$ and selects a decimated output from each FFT for further processing. The DCC 250 may, for example, perform switching and routing operations after performing the above-mentioned FFT/filtering operations, which may, for example, beneficially reduce the speed at which the switching and routing operations need be performed.

The further processed output may then, for example, be output on one or more signals $c_1$ (e.g., output on M output lines, each of which corresponding to one of the M input signals; multiplexed onto a single output line; multiplexed onto more than one and less than M output lines, etc.).

The DCC 250 may, for example, receive channel-selection information from upstream (e.g., via a path from the satellite) and/or from downstream (e.g., from an in-home device), such channel-selection information being indicative of such desired and available channels.

The BMR 215 may additionally comprise an N×Demodulator bank (NDB) 260. Such NDB 260 may, for example, operate to receive the output signal(s) $c_1$ from the DCC 250 and recover the digital information modulated on such received signal(s). The one or more signals $c_2$ output by the NDB 260 (which may comprise one or more digital signals output on one or more output lines) may, for example, comprise one or more transport streams, including for example, media transport streams like MPEG, general data transport streams, etc.

In an exemplary embodiment of the invention, the signal(s) $c_2$ may comprise one or more scrambled and/or encrypted transport streams. Accordingly, the conditional access module (CA) 262 may be operable to descramble and/or decrypt the signal(s) $c_2$. The CA 262 may, however, only descramble and/or decrypt content that is permitted by a service-level agreement between the satellite provider and the owner of the dish 106. Content to which the dish 106 is permitted access (e.g., free content and/or content that the owner of the dish 106 has paid for) may be descrambled and/or decrypted before being output as signal(s) $c_3$. Content to which the dish 106 is not permitted access (e.g., subscription-based content that the owner of the dish 106 has not paid for) may be output as signal(s) $c_3$ in the scrambled and/or encrypted form in which it was received.

The BMR 215 may further comprise a digital rights management (DRM) module 264 which may be operable to generate the signal(s) $c_4$ by applying content protection to the signal(s) $c_3$. The DRM module 264 may, for example, scramble and/or encrypt the signal(s) $c_3$ utilizing one or more keys. The DRM module 264 may, for example, apply content protection in accordance with the DTCP-IP standard. The CA 262 and the DRM 264 may be tightly integrated (e.g., integrated in a single IC, performed by a same processor, etc.) to provide physical protection for the signal(s) $c_3$.

The BMR 215 may further comprise an IP Bridge (BIP) 270 (or other protocol bridge(s)). Such BIP 270 may, for example, operate to receive the output signal(s) $c_4$ from the DRM module 264 (e.g., including transport streams and/or other information) and encapsulate such digital information in IP packets. Such encapsulation may, for example, comprise forming the input digital information into IP packets for downstream communication.

The BIP 270 may also, for example, operate to filter the digital information received from the DRM module 264. Such filtering may, for example, comprise various types of data filtering. For example, the BIP 270 may operate to perform packet identification (PID) filtering to select only desired and available (i.e., content permitted by the CA 262) portions of the input data for encapsulation. Such filtering may, for example, beneficially reduce the amount of IP-encapsulated data that is sent downstream from the IP-LNB 122 to the customer premises (e.g., only desired packets are communicated on the in-home IP network). Such filtering may also enable conditional access and/or digital rights management by restricting which portions of the signal(s) $c_4$ (i.e., which content) can be sent to which network address(es). Such filtering may, for example, be controlled by the operator (e.g., via the conditional access module 262 and control signal(s) received via a satellite channel) and/or by the user (e.g., via control signal(s) received from in-home user apparatus).

The BIP 270 may then output the IP-encapsulated data as one or more output signals $c_5$. The BMR 215 may also comprise a communication interface module 280 operable to interface with an IP network. The BMR 215 may, for example, operate to perform network layer operation, transport layer operation, MAC layer operations, and/or PHY layer operations compatible with one or more network standards (e.g., MoCA and/or Ethernet). In such example, the communication interface module 280 may operate to interface with the IP network by transmitting and/or receiving signals $s_{IP}$ compatible with the IP network.

Figure 3:
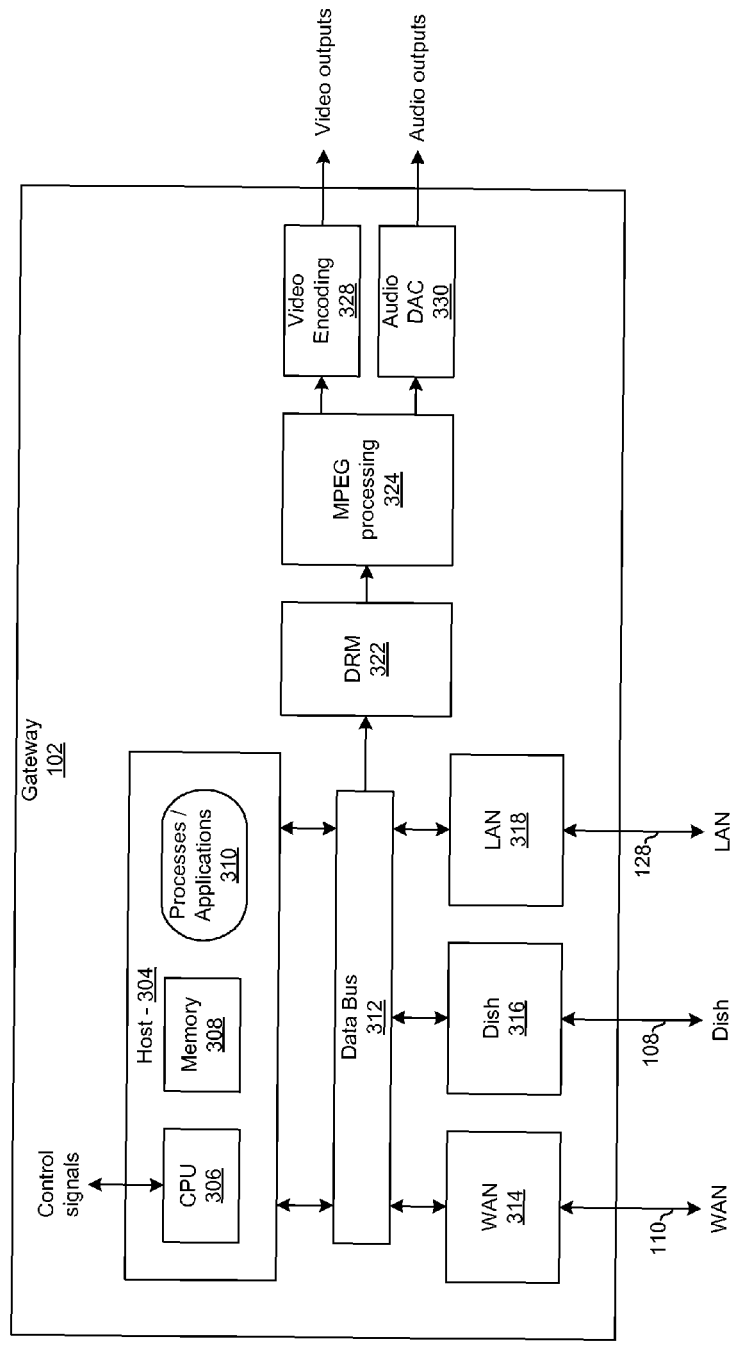
FIG. 3 depicts an exemplary network gateway for use with a satellite dish comprising an IP-LNB.

FIG. 3 depicts an exemplary network gateway for use with a satellite television system. The exemplary gateway 102 comprises a host subsystem 304, a data bus 312, a wide area network (WAN) interface module 314, a dish interface module 316, a LAN interface module 318, a digital rights management (DRM) module 322, an MPEG processing module 324, video encoding module 328, and an audio digital-to-analog conversion (DAC) module 330.

The host subsystem 304 may comprise a CPU 306 and a memory 308 that may be operable to implement processes and/or applications 310 for controlling the overall function of the gateway 102. The processes and/or applications 310 may, for example, comprise an operating system and a graphical user interface.

The WAN interface module 314 may operate as an interface between the data bus 312 and the wide area network 112. The WAN module 314 may support, for example, a WAN protocol such as xDSL or Ethernet in the first mile.

The LAN interface module 318 may operate as an interface between the data bus 312 and the LAN 104. The LAN interface module 318 may support, for example, a protocol such as Ethernet or MoCA.

The dish interface module 316 may operate as an interface between the data bus 312 and the dish 106. The dish interface module 316 may support, for example, a proprietary protocol and/or a standardized protocol such as Ethernet or MoCA. In various exemplary embodiments of the invention, the IP-LNB 122 may be a member of the LAN 104 and may communicate with the gateway 102 in accordance with protocols in use in the LAN 104. In one such embodiment, the dish interface 316 may be substantially the same as the LAN interface 318. In another such embodiment, dish interface module 316 may be absent and the IP-LNB 122, along with the other devices of the LAN 104, may communicate with the gateway 102 via a network switch (which may be internal or external to the gateway 102).

The data bus 312 may comprise circuitry for the communication of data between various modules of the gateway 102. The data bus 312 may operate in accordance with one or more standards such as, for example, the peripheral component interconnect (PCI) express standard.

The digital rights management (DRM) module 322 may be operable to descramble and/or decrypt an MPEG transport stream received via the data bus 312. The key(s) utilized by the DRM module 322 to descramble and/or decrypt may be the same as (for symmetric-key algorithms), or a complimentary to (for asymmetric-key algorithms), the key(s) utilized by the dish 106 in scrambling and/or encrypting the MPEG transport stream.

The MPEG processing module 324 may be operable to demultiplex and decode the MPEG transport stream received via the data bus 312. The video encoding module 328 may be operable to receive a video stream from the MPEG processing module 324 and encode the video for conveyance to an end-user device, such as the television 114, via a wired or wireless connection. (e.g., a point-to-point wired connection such as HDMI). The audio digital-to-analog conversion (DAC) module 330 may be operable to receive a digital audio stream from the MPEG processing module 324 and convert the audio stream to analog for conveyance to one or more speakers.

In operation, the gateway 102 may connect to the WAN 112 via the module 314, connect to the dish 106 via the module 316, and connect to the LAN 104 via the module 318. The gateway 102 may receive an IP-encapsulated MPEG transport stream from the dish 106 via the module 316. The module 316 may extract the MPEG transport stream from the IP stream and convey the MPEG transport stream onto the bus 312. The DRM module 322 may receive the MPEG transport stream from the data bus 312 and descramble and/or decrypt the MPEG transport stream utilizing one or more keys. In an exemplary embodiment of the invention, the keys utilized by the DRM module 322 may have been programmed into the DRM module 322 when pairing the gateway 102 with the dish 106 during installation. In another exemplary embodiment of the invention, the keys utilized by the DRM module 322 may have been received from a server (e.g., server 124 of FIG. 1) of the satellite provider, as, for example, described below with respect to FIG. 8.

The DRM module 322 may pass the descrambled and/or decrypted transport stream to the MPEG processing module 324. The MPEG processing module 324 may demultiplex and decode the MPEG transport stream and output the video to the video encoding module 328 and the audio to the audio DAC module 330. The video encoding module 328 may encode and output the video in accordance with one or more standards (e.g., HDMI or Displayport). The audio DAC module 330 may convert the audio to one or more analog audio signals and output the audio signal to one or more speakers.

Figure 4A:
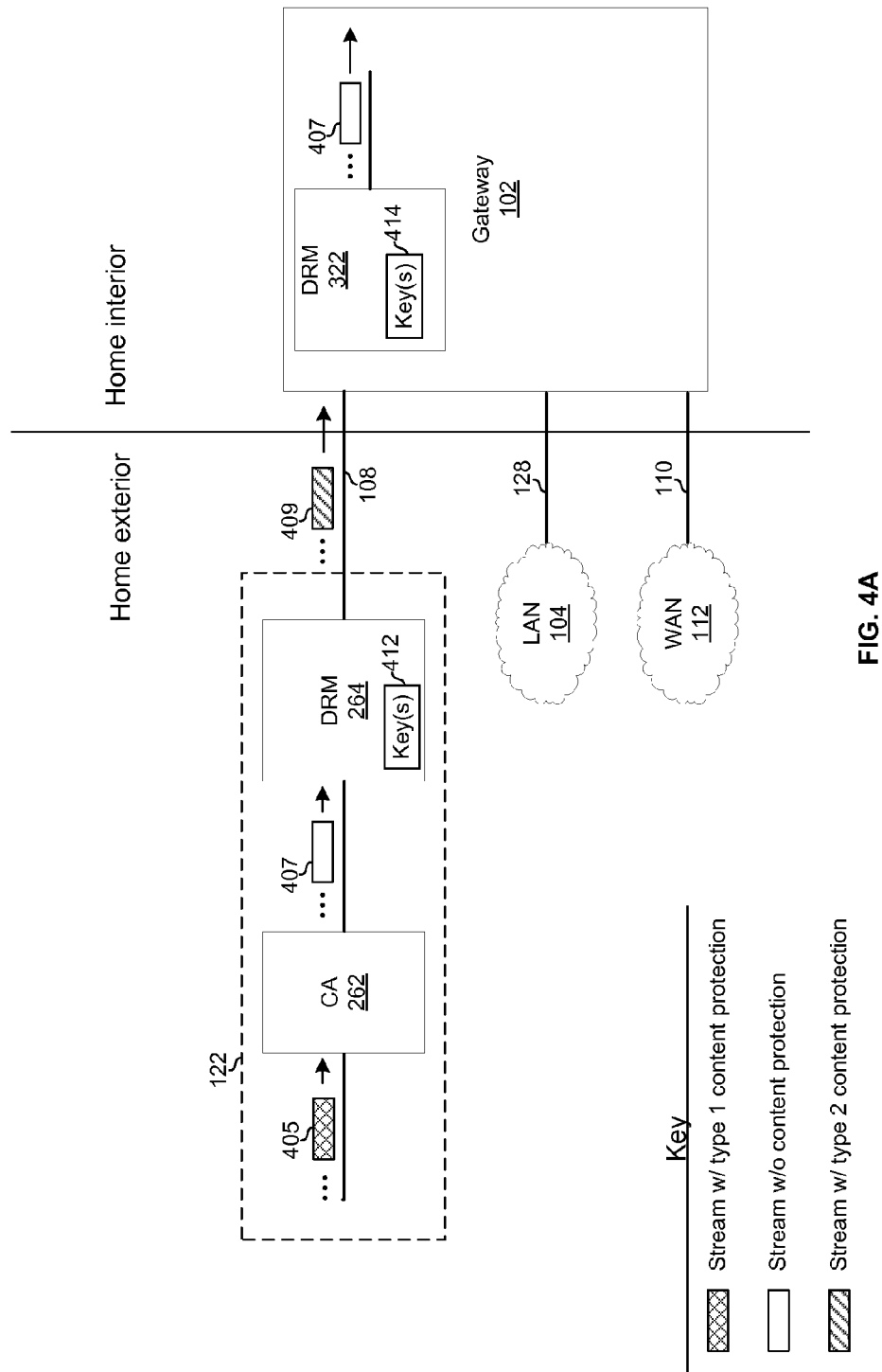
FIG. 4A illustrates removal and application of content protection by an IP-LNB.

FIG. 4 illustrates removal and application of content protection by circuitry collocated with a satellite dish. Shown in FIG. 4 is the IP-LNB 122 and the gateway 102. The IP-LNB 122 receives a content-protected MPEG transport stream 405. The conditional access module 262 descrambles and/or decrypts those portions of the stream to which the dish 106 has access (i.e., free content and content for which the owner of the dish 106 has paid) to generate the unprotected stream 407. The DRM module 264 then applies content protection to the stream 407 to generate the stream 409. The DRM module 264 may protect the stream 407 in accordance with one or more standards such as, for example, DTCP-IP. The encryption and/or scrambling of the stream 407 to generate the stream 409 may utilize one or more keys 412. The key(s) 412 may, for example, be programmed into the IP-LNB 122 when the dish 106 is being installed at the end-user location (e.g., a home) and mated with the gateway 102. Additionally or alternatively, the key(s) 412 may be occasionally and/or periodically updated via received satellite signals. The stream 409 may be communicated to the DRM module 322 of the gateway 102 via the link 108. Note that processing of the stream 409 between the DRM 464 and the DRM module 322 (e.g., by the BIP 270, the IPPM 280, and the dish interface module 316) is not shown in FIG. 4, for simplicity of illustration. Also note that the so-called "unprotected" stream 407 may be physically protected deep within integrated circuitry.

The DRM module 322 may descramble and/or decrypt the stream 409 to recover the stream 407. The descrambling and/or decryption may utilize one or more keys 414. The key(s) 414 may, for example, be programmed into the gateway 102 when the gateway 102 is being installed at the end-user location (e.g., a home) and mated with the dish 106. Additionally or alternatively, the key(s) 414 may be occasionally and/or periodically updated by signals received via any one or more of the modules 314, 316, and 318.

Figure 4B:
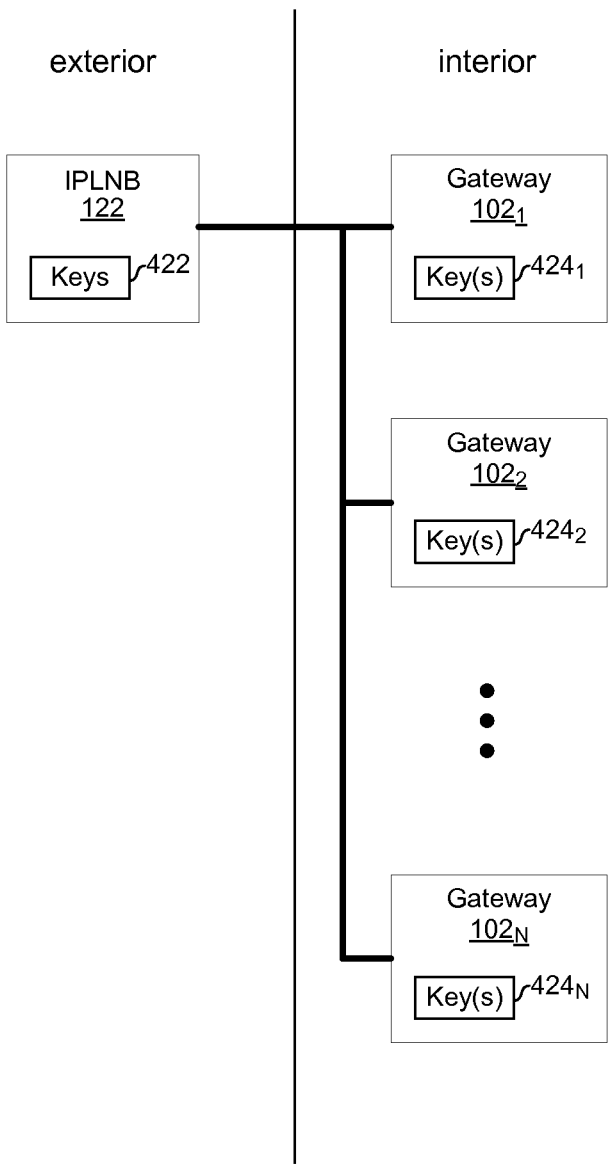
FIG. 4B illustrates application of content protection by an IP-LNB which serves a plurality of gateways.

FIG. 4B illustrates application of content protection by an IP-LNB which serves a plurality of gateways $102_1$-$102_N$. In an exemplary embodiment, each of the gateways $102_1$-$102_N$ may be in a different residence (e.g., a different condominium or apartment of a multi-dwelling unit). The IP-LNB 122 may encode data utilizing a plurality of keys 422. For example, different keys may be utilized for different data depending on a subscription level associated with the data. For example, basic television channels may be encrypted utilizing a first one of the keys 422 and premium television channels may be encrypted utilizing a second one of the keys 422. Thus, in a symmetric key system, the keys 422 may be a superset of the keys $424_1$-$424_N$. In an exemplary asymmetric key system, the keys 422 may be a superset of public [private] keys which are correspond to the private [public] keys $424_1$-$424_N$. In this manner, different ones of the gateways $102_1$-$102_N$ may have access to different data depending on their subscriptions.

Figure 5:
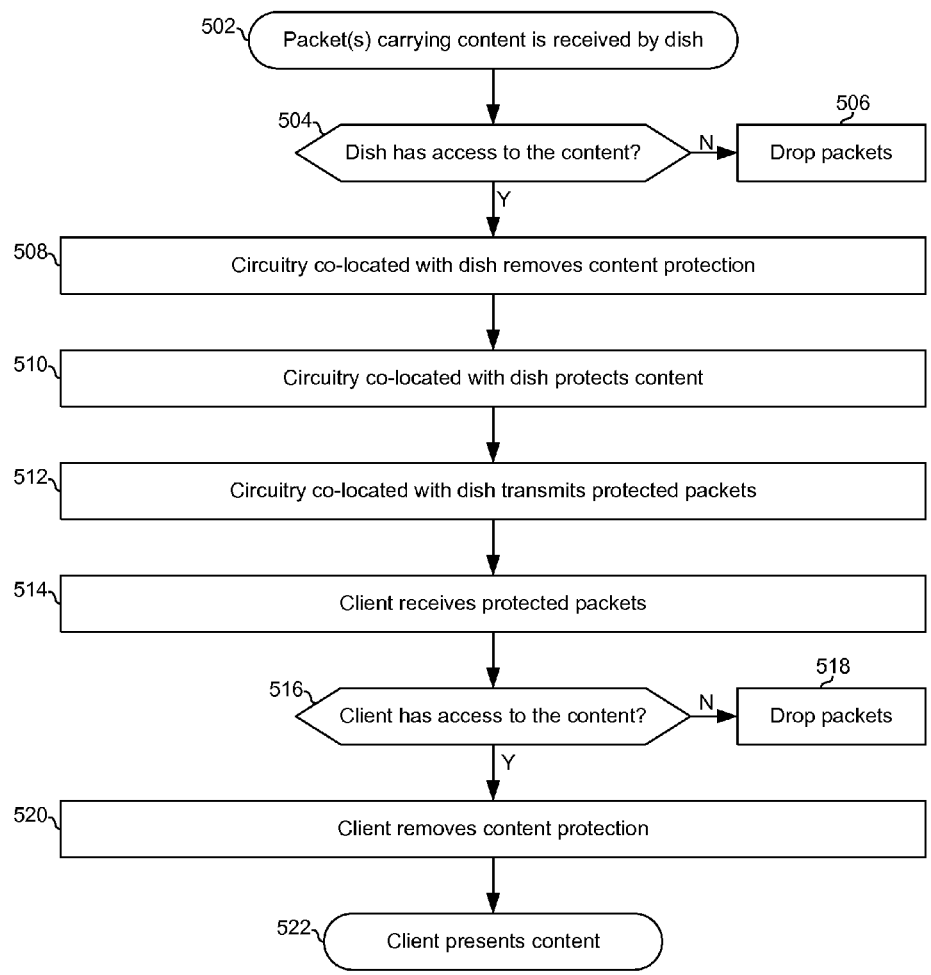
FIG. 5 is a flowchart illustrating exemplary steps for receiving satellite television signals by removing and adding content protection at the dish.

FIG. 5 is a flowchart illustrating exemplary steps for receiving satellite television signals by removing and adding content protection at the dish. The exemplary steps may begin with step 502 in which one or more packets carrying protected content is received by the IP-LNB 122 of the dish 106.

In step 504, if the owner of the dish 106 does not have access to the protected content (e.g., if the owner of the dish 106 has not paid for the content), then, in step 506, the packets may be dropped by the IP-LNB 122. Returning to step 504, if the owner of the dish 106 does have access to the protected content (e.g., if the owner of the dish 106 has paid for the content), then the exemplary steps advance to step 508.

In step 508, the IP-LNB 122 may remove the content protection from the received packets. Such removal of content protection may comprise descrambling and/or decrypting the packets. In step 510, the IP-LNB 122 may apply content protection to the packets. For example, after the content protection applied by the satellite provider is removed in step 508, content protection in accordance with a standard such as DTCP-IP may be applied in step 510.

In step 512, the protected packets may be processed for transmission onto a network link, such as the link 108. Such processing may, for example, comprise encapsulating the packets in an IP packet stream.

In step 514, the packets may be received by a client device connected to the network link 108.

In step 516, if the client device does not have access to the protected content (e.g., if the client does not have the correct security keys to descramble and/or decrypt the packets), then, in step 518, the packets may be dropped by the client device. Returning to step 516, if the client device does have access to the protected content (e.g., if the client has the correct security keys to descramble and/or decrypt the packets), then the exemplary steps advance to step 520.

In step 520, the packets may be descrambled and/or decrypted to recover the content contained therein. In step 522, the content may be further processed for presentation to a viewer/listener.

Figure 6:
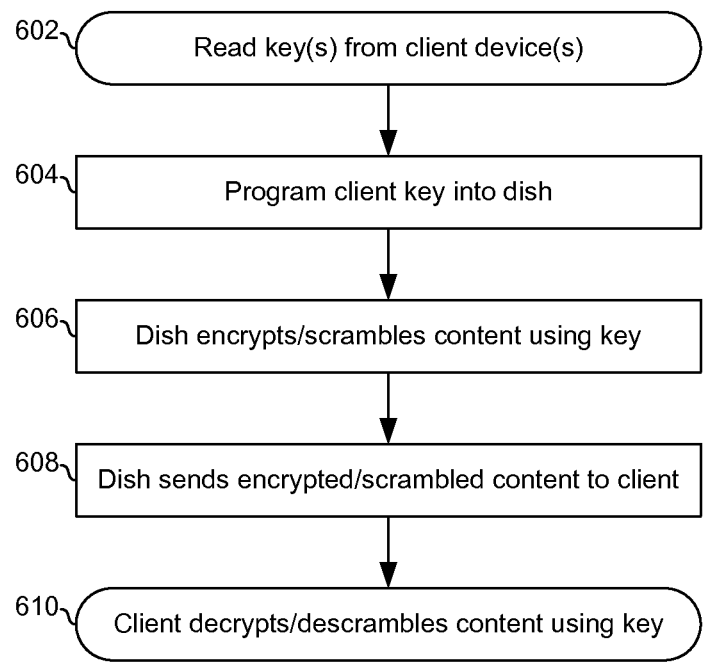
FIG. 6 is a flowchart comprising exemplary steps for configuration of a dish and client to enable removing and subsequently adding content protection at the dish.

FIG. 6 is a flowchart comprising exemplary steps for configuration of a dish and client to enable removing and subsequently adding content protection at the dish. The exemplary steps begin with step 602 in which one or more security keys are read out of a client device, such as the gateway 102. The key(s) may, for example, be based on a hardware unique identifier programmed into the client device during production of the client device. The reading of the key(s) may occur, for example, during installation in the end-user premises using special equipment possessed by an installation technician.

In step 604, the key(s) read from the client device may be programmed into circuitry collocated with a satellite dish (e.g., the IP-LNB 122). This may occur, for example, during installation in the end-user premises using special equipment possessed by an installation technician.

In step 606, during operation of the dish and client, the circuitry collocated with the dish may scramble and/or encrypt content using the key(s) programmed into the dish in step 604. Next, in step 608, the circuitry collocated with the dish may transmit the scrambled and/or encrypted content onto a network link.

In step 610, the client may receive the content via the network link, and descramble and/or decrypt content using the key(s) read out of the client in step 602.

Figure 7:
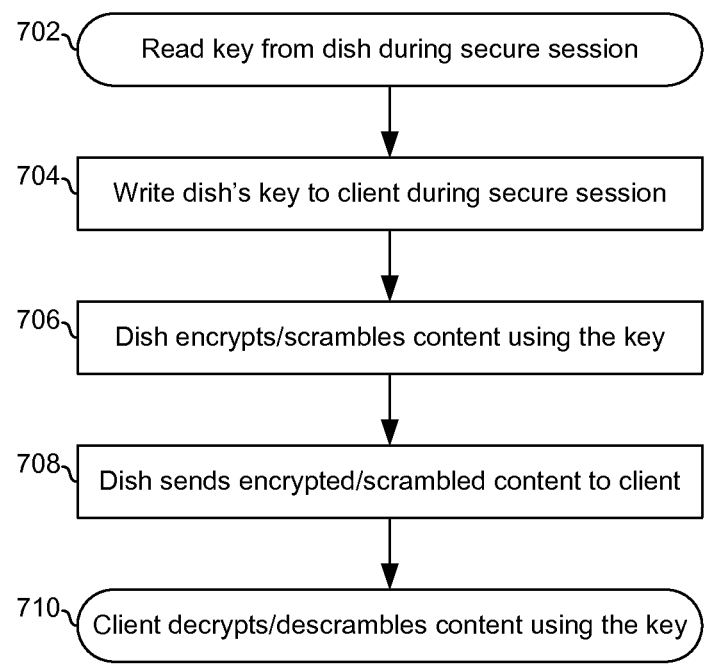
FIG. 7 is a flowchart comprising exemplary steps for configuration of a dish and client to enable removing and subsequently adding content protection at the dish.

FIG. 7 is a flowchart comprising exemplary steps for configuration of a dish and client to enable removing and subsequently adding content protection at the dish. The exemplary steps begin with step 702 in which one or more security keys are read out of a circuit collocated with (or intended to be collocated with) a satellite dish. The key(s) may, for example, be based on a hardware unique identifier programmed into the circuit during production of the circuit. The reading of the key(s) may occur, for example, during installation in the end-user premises using special equipment possessed by an installation technician.

In step 704, the key(s) read from the client device may be programmed into a client device (e.g., the gateway 102). This may occur, for example, during installation in the end-user premises using special equipment possessed by an installation technician.

In step 706, during operation of the dish and client, the circuitry collocated with the dish may scramble and/or encrypt content using the key(s) read out in step 702. Next, in step 708, the circuitry collocated with the dish may transmit the scrambled and/or encrypted content onto a network link.

In step 710, the client may receive the content via the network link, and descramble and/or decrypt content using the key(s) using the key(s) programmed into the client device in step 704.

Figure 8:
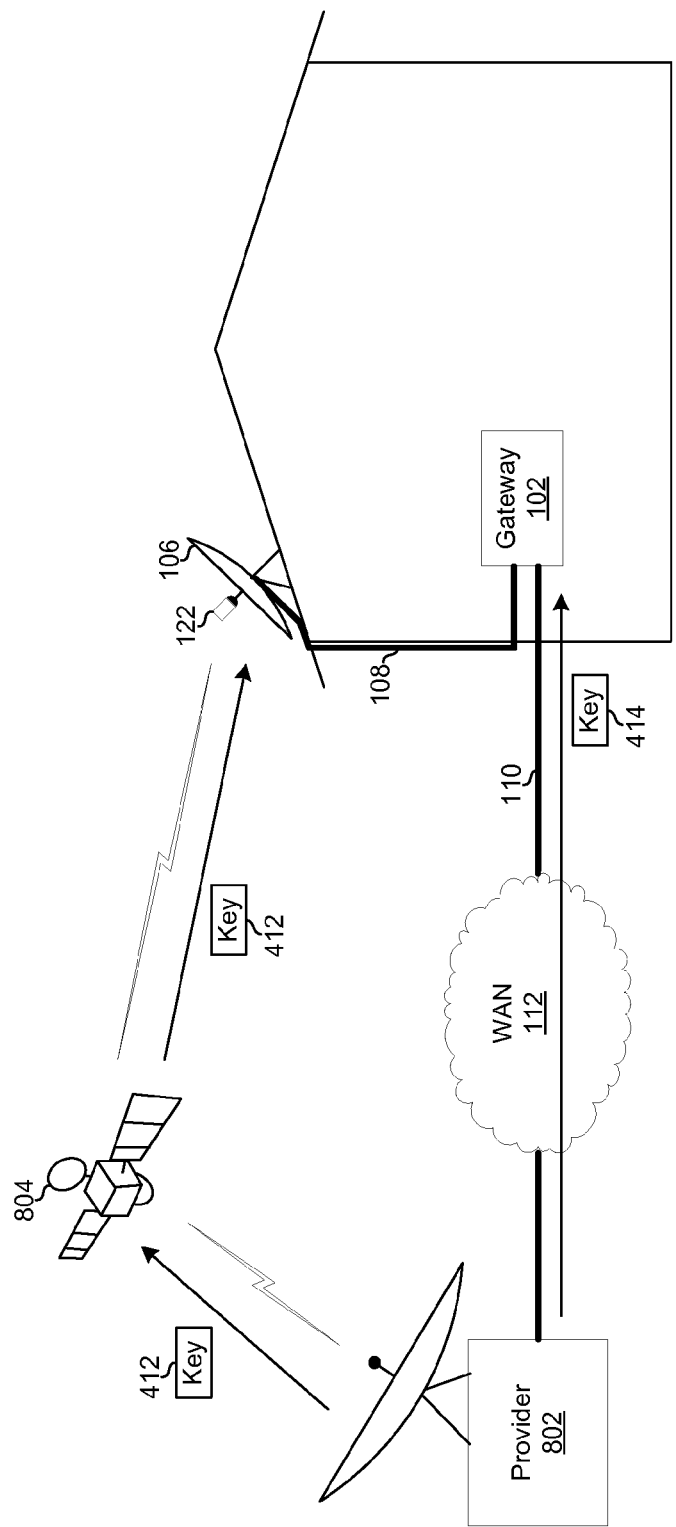
FIG. 8 is a diagram illustrating configuration of security keys in a satellite television system that removes and adds content protection at the dish.

FIG. 8 is a diagram illustrating configuration of security keys in a satellite television system that removes and adds content protection at the dish. Shown in FIG. 8, is the dish 106 with IP-LNB 122, the gateway 102, the WAN 112, a provider 802, and a satellite 804.

In operation, the provider 802 may occasionally and/or periodically send a new one or more keys 412 to the dish 106. Upon update of the key(s) 412, the key(s) 414 in the gateway 102 will also need to be updated so that the gateway 102 can continue to descramble and/or decrypt signals from the dish 106. Accordingly, the provider may establish a secure connection to the gateway 102 via the WAN 112. After verifying the identity of the gateway 102 (including verifying that the gateway 102 has been registered with the dish 106 and/or IP-LNB 122), the provider may send the one or more keys 414 to the gateway 102. Accordingly, if the gateway 102 is not a client that is registered with the dish 106 and/or IP-LNB 122, the gateway 102 will be unable to obtain the key(s) 414 for descrambling and/or decrypting content from the dish 106. Similarly, because the key(s) 414 are uniquely compatible with the dish 106, if the gateway 102 is not connected to the dish 106 but is connected to another dish (not shown), the gateway 102 will be unable to descramble and/or decrypt content from such other dish.

In an exemplary embodiment of the invention, one or more circuits (e.g., the BMR 215) for use in a transceiver that is collocated with a satellite dish (e.g., the IP-LNB 122 collocated with the dish 106), may receive a satellite signal carrying media content, and remove first content protection from the received media content (e.g., content protection applied by a satellite television provider). After removing the first content protection, the one or more circuits may apply second content protection to the media content. The second content protection applied by the one or more circuits may adhere to a different protocol, utilize different keys, and/or otherwise be distinguishable from the content protection that was removed. After applying the second content protection, the one or more circuits may transmit the media content onto one or more links (e.g., the link 108) between the satellite dish and one or more client devices (e.g., the gateway 102). The one or more circuits may be operable to packetize the scrambled and/or encrypted media content into one or more Internet Protocol (IP) packets prior to the transmitting the media content onto the network link. The removal of the second content protection may comprise descrambling and/or decrypting the media content. The application of the second content protection may comprise scrambling and/or encrypting the media content. The scrambling and/or encryption may utilize a key that corresponds to a hardware unique identifier of the one or more circuits. The scrambling and/or encrypting of the media content may be performed in adherence to the DTCP-IP standard. The one or more circuits may be integrated on a common substrate with a low noise block-downconverter (e.g., LNB 210) of the satellite dish.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for conditional access in an in-home network based on multi-network communication.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
   one or more circuits for use in a transceiver that is collocated with a satellite dish, said one or more circuits being operable to:
   read one or more encryption keys from one or more client devices;
   receive a satellite signal carrying media content;
   remove first content protection from said media content;
   after said removal of said first content protection, apply second content protection to said media content using said one or more encryption keys read from said one or more client devices; and
   after said application of said second content protection, transmit said media content onto one or more links between said satellite dish and said one or more client devices.

2. The system of claim 1, wherein said removal of said content protection comprises descrambling and/or decrypting said media content.

3. The system of claim 1, wherein said application of said second content protection comprises scrambling and/or encrypting said media content.

4. The system of claim 3, wherein each of said one or more encryption keys corresponds to a hardware unique identifier of a respective one of said one or more client devices.

5. The system of claim 3, wherein said one or more encryption keys comprises a plurality of encryption keys, each of said plurality of encryption keys being associated with a different subscription level.

6. The system of claim 3, wherein said second content protection is applied in adherence to the DTCP-IP standard.

7. The system of claim 1, wherein said one or more circuits are operable to, prior to said transmitting said media content, packetize said media content into one or more Internet Protocol (IP) packets.

8. The system of claim 1, wherein said one or more circuits are integrated on a common substrate with a low noise block-downconverter of said satellite dish.

9. A method comprising:
performing by one or more circuits of a transceiver that is collocated with a satellite dish:
reading one or more encryption keys from one or more client devices;
receiving a satellite signal carrying media content;
removing first content protection from said media content;
after said removal of said first content protection, applying second content protection to said media content using said one or more encryption keys read from said one or more client devices; and
after said application of said second content protection, transmitting said media content onto one or more links between said satellite dish and one or more client devices.

10. The method of claim 9, wherein said removing said first content protection comprises descrambling and/or decrypting said media content.

11. The method of claim 9, wherein said applying said second content protection comprises scrambling and/or encrypting said media content.

12. The method of claim 11, wherein each of said a one or more encryption keys that corresponds to a hardware unique identifier of a respective one of said one or more client devices.

13. The method of claim 11, wherein said second content protection is applied in adherence to the DTCP-IP standard.

14. The method of claim 9, comprising, prior to said transmitting said media content, packetizing said media content into one or more Internet Protocol (IP) packets.

15. The method of claim 9, wherein said one or more circuits are integrated on a common substrate with a low noise block-downconverter of said satellite dish.

16. A system comprising:
one or more circuits for use in a transceiver that is collocated with a satellite dish, said one or more circuits being operable to:
read one or more encryption keys from one or more set-top-boxes;
receive a packet stream via satellite;
remove content protection from said received packet stream, said content protection having been applied by a provider of said satellite signal;
scramble and/or encrypt said packet stream using said one or more encryption keys read from said one or more client devices; and
transmit said scrambled and/or encrypted packet stream onto a network link.

17. The system of claim 16, wherein said removal of said content protection comprises descrambling and/or decrypting said media content.

18. The system of claim 16, wherein said one or more circuits are operable to encapsulate said encrypted and/or scrambled packet stream into one or more Internet Protocol (IP) packets prior to said transmission onto said network link.

19. The system of claim 16, wherein said first one or more circuits are integrated on a common substrate with a low noise block-downconverter.

20. The system of claim 16, wherein each of said one or more encryption keys corresponds to a hardware unique identifier of a respective one of said one or more client devices.

21. The system of claim 16, wherein said scrambling and/or encrypting is performed in adherence to the DTCP-IP standard.

* * * * *